United States Patent
Chakraborty et al.

(10) Patent No.: US 9,894,507 B2
(45) Date of Patent: Feb. 13, 2018

(54) AUTOMATIC DATA EXCHANGE BETWEEN PEER DEVICES

(71) Applicant: CA, Inc., New York, NY (US)

(72) Inventors: Saugata Chakraborty, Bengaluru (IN); Swapnel Shrivastava, Bangalore (IN); Sudip Mitra, Bangalore Karnataka (IN)

(73) Assignee: CA, Inc., New York, NY (US)

( * ) Notice: Subject to any disclaimer, the term of this patent is extended or adjusted under 35 U.S.C. 154(b) by 67 days.

(21) Appl. No.: 15/045,858

(22) Filed: Feb. 17, 2016

(65) Prior Publication Data

US 2017/0238161 A1 Aug. 17, 2017

(51) Int. Cl.
| | |
|---|---|
| *H04B 15/00* | (2006.01) |
| *H04W 8/00* | (2009.01) |
| *H04W 76/02* | (2009.01) |
| *H04W 24/10* | (2009.01) |
| *H04B 17/318* | (2015.01) |

(52) U.S. Cl.
CPC .......... *H04W 8/005* (2013.01); *H04B 17/318* (2015.01); *H04W 24/10* (2013.01); *H04W 76/023* (2013.01)

(58) Field of Classification Search
CPC ... H04W 8/005; H04W 24/10; H04W 76/023; H04B 17/309; H04B 17/318; H04B 17/336
USPC .................................................. 455/500, 502
See application file for complete search history.

(56) References Cited

U.S. PATENT DOCUMENTS

| | | | |
|---|---|---|---|
| 8,743,778 B2 | 6/2014 | Gordon et al. | |
| 2006/0046709 A1 | 3/2006 | Krumm et al. | |
| 2008/0108308 A1 | 5/2008 | Ullah | |
| 2008/0256097 A1 | 10/2008 | Messer et al. | |
| 2010/0290424 A1 | 11/2010 | Collingrige | |
| 2012/0083285 A1 | 4/2012 | Shatsky et al. | |
| 2012/0306770 A1* | 12/2012 | Moore | G06F 3/01 345/173 |
| 2013/0005257 A1* | 1/2013 | Rajaraman | H04W 8/005 455/41.2 |
| 2014/0370814 A1 | 12/2014 | Bi et al. | |
| 2017/0140593 A1* | 5/2017 | Pluss | G07C 9/00309 |

* cited by examiner

*Primary Examiner* — Yuwen Pan
*Assistant Examiner* — Fatuma Sherif
(74) *Attorney, Agent, or Firm* — Coats & Bennett, PLLC

(57) ABSTRACT

A peer device has a proximity sensor that detects proximity to another object. Responsive to that detection, the peer device obtains a set of results that comprises results of different types of measurements. The set of results is sensitive to a location of the peer device and a time at which the measurements are performed by the peer device. The peer device configures itself to be discoverable by other peer devices. Responsive to wirelessly connecting with a target peer device that is also discoverable, the peer device determines an extent to which the obtained set of results matches a corresponding set of results obtained by the target peer device. Responsive determining that the sets of results respectively obtained by the devices match to a required extent, the peer device automatically transmits or receives application-specific data over an unauthenticated, non-persistent communication session between the peer device and the target peer device.

21 Claims, 9 Drawing Sheets

100

Detect, by a peer device, that the peer device is in proximity to another object, based on a proximity sensor of the peer device detecting a change in an electromagnetic field, or beam of electromagnetic radiation, emitted by the proximity sensor
110

Responsive to the detecting, obtain a set of results that comprises results of different types of measurements, wherein the set of results is sensitive to a location of the peer device and a time at which the measurements are performed by the peer device, and configure the peer device to be discoverable by other peer devices
120

Responsive to wirelessly connecting with a target peer device that is also discoverable, determine an extent to which the obtained set of results matches a corresponding set of results obtained by the target peer device
130

Responsive to the peer device determining that the sets of results respectively obtained by the devices match to a required extent, automatically transmit or receive application-specific data over an unauthenticated, non-persistent communication session between the peer device and the target peer device
140

*FIG. 2*

AUTOMATIC DATA EXCHANGE BETWEEN PEER DEVICES

BACKGROUND

The present disclosure generally relates to exchange of data between peer devices.

Device-to-device communication enables direct communication between "peer" devices that are within direct communication range of one another. Peer devices accordingly transfer data between themselves without relaying that data through any intermediate device. This proves efficient in terms of the resources required to transfer the data, and tends to improve the coverage of other communication systems.

Bluetooth is one example of a wireless technology standard used for device-to-device communication. In this and other technology standards, peer devices transmit discovery signals to advertise their availability for communication. A peer device displays to its user a list of discoverable devices from whom discovery signals are detected. Once the user manually selects a particular discoverable device, the peer devices perform a pairing process so that the devices can communicate securely.

BRIEF SUMMARY

The present disclosure provides a method, an apparatus, and a corresponding computer program product for automatically transferring application-specific data between peer devices.

According to some embodiments, for example, a method comprises a peer device detecting that the peer device is in proximity to another object. The peer device detects this based on a proximity sensor of the peer device detecting a change in an electromagnetic field, or beam of electromagnetic radiation, emitted by the proximity sensor. The method further comprises, responsive to that detecting, obtaining a set of results that comprises results of different types of measurements. The set of results is sensitive to a location of the peer device and a time at which the measurements are performed by the peer device. Also responsive to detecting that the peer device is in proximity to another object, the method comprises configuring the peer device to be discoverable by other peer devices.

Responsive to the peer device wirelessly connecting with a target peer device that is also discoverable, the method further comprises determining an extent to which the obtained set of results matches a corresponding set of results obtained by the target peer device. The peer device determines this by (i) sending only a portion of the results in the set to the target peer device and, for ones of the results in the sent portion, receiving a response indicating whether the result matches a result obtained by the target peer device; and (ii) receiving a result obtained by the target peer device and indicating in response whether the received result matches one of the results in the set obtained by the peer device. Responsive to the peer device determining that the sets of results respectively obtained by the devices match to a required extent, the method comprises automatically transmitting or receiving application-specific data over an unauthenticated, non-persistent communication session between the peer device and the target peer device.

According to other embodiments, a peer device comprises a communications interface to a target peer device. The peer device also comprises processing circuitry. The processing circuitry is configured to detect that the peer device is in proximity to another object. The processing circuitry detects this based on a proximity sensor of the peer device detecting a change in an electromagnetic field, or beam of electromagnetic radiation, emitted by the proximity sensor. The processing circuitry is also configured to, responsive to that detection, obtain a set of results that comprises results of different types of measurements. The set of results is sensitive to a location of the peer device and a time at which the measurement is performed by the peer device. Also responsive to the detection, the processing circuitry is configured to configure the peer device to be discoverable by other peer devices.

The processing circuitry is also configured to, responsive to the peer device wirelessly connecting with a target peer device that is also discoverable, determine an extent to which the obtained set of results matches a corresponding set of results obtained by the target peer device. The processing circuitry is configured to determine this by (i) sending a result in the set to the target peer device and receiving a response indicating whether the result matches a result obtained by the target peer device; and (ii) receiving a result obtained by the target peer device and indicating in response whether the received result matches one of the results in the set obtained by the peer device. The processing circuitry is also configured to, responsive to the peer device determining that the sets of results respectively obtained by the devices match to a required extent, automatically transmit or receive application-specific data over an unauthenticated, non-persistent communication session between the peer device and the target peer device.

According to still other embodiments, a computer program product is stored on a computer-readable storage medium and comprises computer program code. The computer program code, when executed by processing circuitry of a peer device, configures the peer device to detect that the peer device is in proximity to another object. This detection is based on a proximity sensor of the peer device detecting a change in an electromagnetic field, or beam of electromagnetic radiation, emitted by the proximity. The computer program code, when executed by processing circuitry of a peer device, also configures the peer device to, responsive to the detection, obtain results of different types of measurements that are each sensitive to a location of the peer device and a time at which the measurement is performed by the peer device, and configure the peer device to be discoverable by other peer devices.

The computer program code, when executed by processing circuitry of a peer device, further configures the peer device to, responsive to the peer device wirelessly connecting with a target peer device that is also discoverable, determine an extent to which the obtained set of results matches a corresponding set of results obtained by the target peer device. The computer program code, when executed by processing circuitry of a peer device, configures the peer device to determine this by (i) sending a result in the set to the target peer device and receiving a response indicating whether the result matches a result obtained by the target peer device; and (ii) receiving a result obtained by the target peer device and indicating in response whether the received result matches one of the results in the set obtained by the peer device. The computer program code, when executed by processing circuitry of a peer device, further configures the peer device to, responsive to the peer device determining that the sets of results respectively obtained by the devices match to a required extent, automatically transmit or receive application-specific data over an unauthenticated, non-persistent communication session between the peer device and the target peer device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

FIG. 2 is a logic flow diagram of a method performed by a peer device according to one or more embodiments.

DETAILED DESCRIPTION

Figure 1:
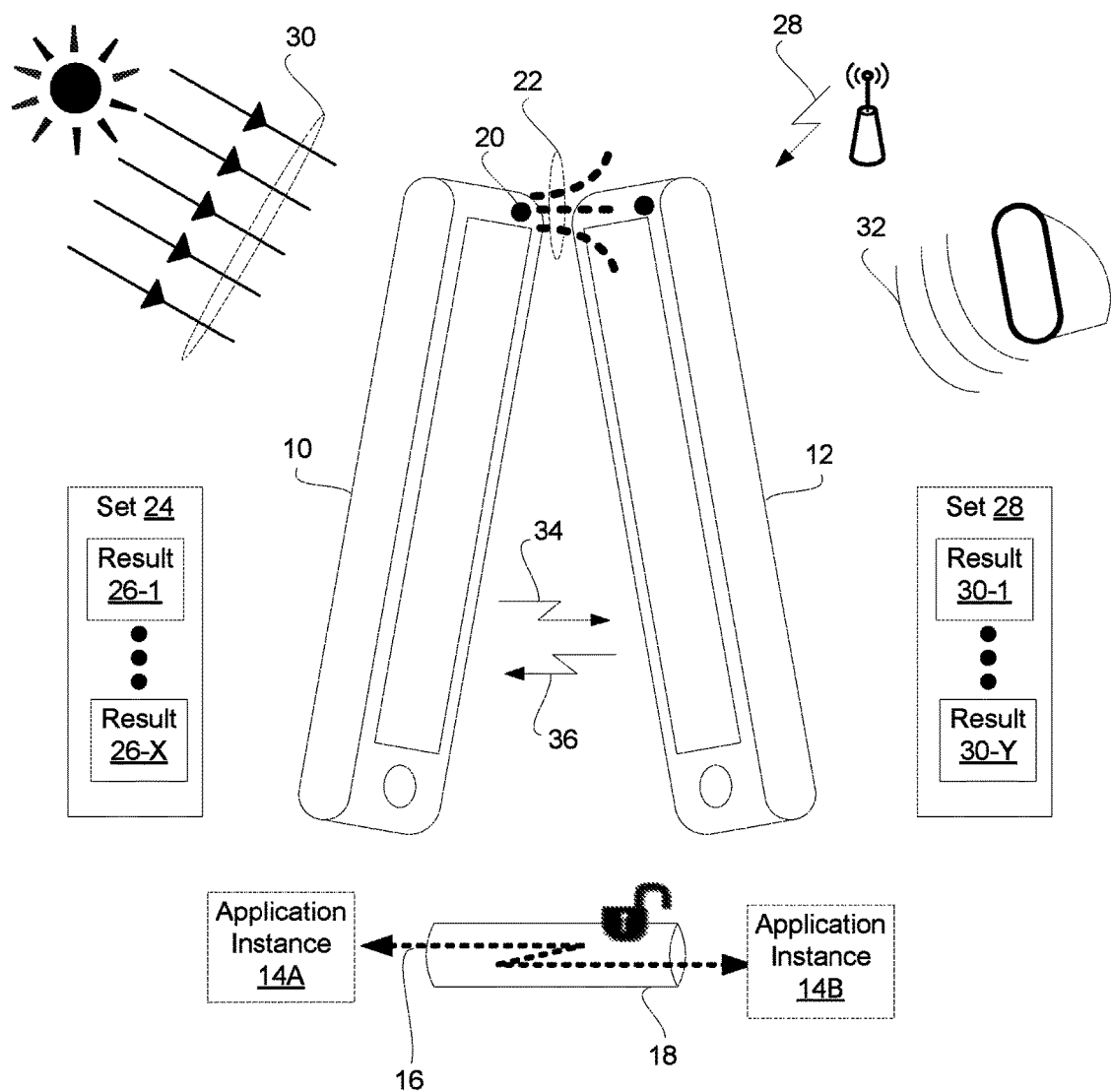
FIG. 1 is a block diagram of a peer device according to one or more embodiments.

FIG. 1 illustrates a peer device 10 according to some embodiments. The peer device 10 is configured to wirelessly transmit data to or receive data from a target peer device 12. This data may be application-specific in the sense that it is specific to an application executed by one or both of the peer devices 10, 12. The data may for instance originate from or ultimately be destined to such an application. FIG. 1 for example shows that both peer devices 10, 12 execute respective instances 14A, 14B of the same application (e.g., a Contacts, Calendar, or Photos application). These instances 14A, 14B may be the same version of the same application, or different compatible versions of the same application. Regardless, data 16 (e.g., associated with a contact) is transferred between those application instances 14A, 14B, e.g., in one or both directions.

In various embodiments, the peer device 10 is configured to transmit or receive application-specific data 16 over a communication session 18 between the peer device 10 and the target peer device 12. The communication session 18 itself may be unsecured. For example, the communication session 18 may be unauthenticated in the sense that the communication session 18 is established without authenticating the peer devices 10, 12 to one another. The peer devices 10, 12 may for instance establish the communication session 18 without verifying each other's identity using a shared secret (e.g., a PIN or link key), public key cryptography, or the like. In some embodiments where the communication session 18 is based on Bluetooth, the peer devices 10, 12 may forgo pairing or bonding as a condition for establishing the communication session 18.

Moreover, the communication session 18 in some embodiments is non-persistent, e.g., stateless or temporary. The peer device 10, 12 may for instance refrain from storing one or more session parameters associated with the communication session 18. In this case, therefore, loss of connection between the peer devices 10, 12 requires that the peer devices 10, 12 establish a new communication session, rather than resuming a previous communication session. Again in some embodiments where the communication session 18 is based on Bluetooth, the peer devices 10, 12 may refrain from storing any shared secret or keys that would otherwise be stored had pairing or bonding occurred.

In any event, the peer device 10 is configured to automatically transmit or receive application-specific data 16 over the communication session 18. The data transmission or reception is automatic in the sense that it is performed without manual input from a user of the peer device 10, e.g., via the peer device's user interface. That is, the peer device's user need not manually initiate the data transfer. For example, the peer device's user need not select the target peer device 12 from a list of discoverable peer devices. As another example, the peer device's user need not enter any sort of code or PIN via the peer device's user interface.

The peer device 10 is configured to automatically transmit or receive application-specific data 16 over the communication session 18 responsive to determining that certain conditions or circumstances are met. These conditions or circumstances may be defined to indicate that the peer device 10 is in proximity to the target peer device 12, e.g., in a way that suggests the peer devices' users desire automatic data transfer between the devices 10, 12 to occur. FIG. 2 illustrates processing 100 performed by the peer device 10 according to some embodiments in this regard, with occasional reference back to FIG. 1.

As shown in FIG. 2, processing 100 at the peer device 10 comprises detecting that the peer device 10 is in proximity to another object, based on a proximity sensor 20 of the peer device 10 detecting a change in an electromagnetic field 22, or beam of electromagnetic radiation (e.g., infared), emitted by the proximity sensor 20 (Block 110). Note that the proximity sensor 20 may be incapable of distinguishing to which object the peer device 10 is in proximity, e.g., whether the object is a table or actually the target peer device 12. In fact, in one embodiment where the peer device 20 is a smart phone with a touchscreen, the proximity sensor 20 has a dual-purpose in detecting accidental touchscreen taps when the peer device 20 is held to the user's ear during a phone call. This and other embodiments, therefore, exploit the proximity sensor 20 as a type of sensor that many existing peer devices are already equipped with.

Regardless, processing 100 at the peer device 10 further comprises, responsive to the peer device 10 detecting proximity to another object, obtaining a set 24 of results 26-1 . . . 26-X that comprises results of different types of measurements (Block 120). This set 24 of results 26-1 . . . 26-X is sensitive to a location of the peer device 10 and a time at which the measurements are performed by the peer device 10. In some embodiments, the overall 24 set is sensitive to device location and measurement time, even though any given individual type of measurement may not be sensitive to both device location and measurement time. In other embodiments, though, each type of measurement in the set 24 is sensitive to both device location and measurement time.

In the embodiment shown in FIG. 1, for example, the different types of measurements comprise a measurement of a strength of a wireless local or personal area network signal 28 detected by the peer device 10, a measurement of ambient light 30 detected by the peer device 10, and a measurement of noise 32 detected by the peer device 10. This embodiment may therefore exploit the fact that many existing peer devices are already capable of performing these types of measurements, such that the peer device 10 need not be equipped with special or even dedicated hardware for performing processing 100.

No matter the particular type of measurements, though, processing 100 at the peer device 10 also comprises, responsive to the peer device 10 detecting proximity to another object, configuring the peer device 10 to be discoverable by other peer devices (Block 120). This may entail for instance initiating transmission of discovery signals (e.g., beacons) from the peer device 10, responsive to the peer device 10 detecting proximity to another object (and if discovery signals are not already being transmitted). The peer device 10 may also begin searching for any other peer device that is discoverable, in order to attempt to connect to such a device.

Responsive to wirelessly connecting with a target peer device 12 that is also discoverable, processing 100 at the peer device 10 further comprises determining an extent to which the obtained set 24 of results 26-1 . . . 26-X matches a corresponding set 28 of results 30-1 . . . 30-Y obtained by the target peer device 12 (Block 130). The peer device 12 may for instance determine how many of the results 26-1 . . . 26-X in the obtained set 24 match results 30-1 . . . 30-Y of the same measurement type in the set 28 obtained by the target peer device 12, e.g., based on the peer devices 10, 12 exchanging information about the results. Responsive to the peer device 10 determining that the sets 24, 28 of results respectively obtained by the devices 10, 12 match to a required extent (e.g., 95%), processing 100 comprises automatically transmitting or receiving the application-specific data 16 over the communication session 18 between the peer device 10 and the target peer device 12 (Block 140). Note that the target peer device 12 may perform the same sort of processing in parallel with peer device 10, e.g., also responsive to detecting proximity to another object.

According to some embodiments, processing 100 initiates automatic data exchange in this way based on an underlying assumption that such automatic data exchange is desired by the peer devices' users. Specifically in this regard, the fact that the location-sensitive sets 24, 28 of measurement results match to the required extent suggests that the peer devices 10, 12 are located closely together. Because the sets 24, 28 of measurements are also time sensitive, though, their matching is dependent on the peer devices 10, 12 having performed those measurements sufficiently close enough in time. Since the peer devices 10, 12 trigger performance of the measurements on proximity detection, matching of the sets 24, 28 also suggests that the peer devices 10, 12 are in proximity to one another; that is, that the object detected as being in proximity is in fact the other peer device, even though the proximity sensor 20 is incapable of making that distinction. This peer device proximity, deduced from matching sets of measurements, forms the basis for assuming that the users desire automatic data transfer in some embodiments.

Of course, the peer device 10 may perform automatic data transfer responsive to one or more other conditions having also been met, e.g., to further bolster an assumption that the users desire automatic data transfer. The peer device 10 in this case may selectively perform one or more of the steps in processing 100 when certain condition(s) are met.

In one embodiment, for example, the peer device 10 obtains the set 24 of results 26-1 . . . 26-X also responsive to the peer device 10 actively executing a type of application for which automatic data transfer is supported. Alternatively or additionally, the peer device 10 determines the extent to which the obtained set 24 of results 26-1 . . . 26X matches the corresponding set 28 of results 30-1 . . . 30-Y obtained by the target peer device 12 also responsive to both the peer device 10 and the target peer device 12 actively executing the application to which the application-specific data 16 is specific. The peer devices 10, 12 in this regard may exchange application identifiers for applications that they are actively executing, and proceed with sending/receiving of measurement results only if those identifiers match or correspond to one another (e.g., as compatible versions of the same applications). Alternatively, a random universally unique identifier (UUID) that is embedded within the application could be used in place of an actual application identifier. In a similar embodiment, one of the peer devices 10, 12 may send its application identifier or embedded UUID to the other of the peer devices 10, 12 that determines whether the actively executed applications are the same, e.g., before or as part of exchanging measurement results.

Alternatively or additionally, the peer device 10 determines the extent to which the obtained sets 24, 28 match, further responsive to the peer device 10 and the target peer device 12 being oriented relative to one another in a certain way predefined as a condition for that determination. The predefined orientation may for instance dictate that the peer devices 10, 12 be face-to-face as shown in FIG. 1. In some embodiments, this predefined orientation disregards whether the peer devices 10, 12 are absolutely oriented in a vertical or horizontal direction, e.g., whether the peer devices 10, 12 are face-to-face in an upright orientation or in a horizontal orientation.

Regardless, the peer device 10 may identify whether the peer device 10 and the target peer device 12 are oriented in the predefined way by comparing the results of measurements by respective gravity or orientation sensors of the devices 10, 12. These results may be exchanged prior to or in conjunction with other measurement results.

Consider an example in which the peer devices 10, 12 must be oriented face-to-face in order to trigger automatic data transfer. In this example, gravity sensor measurements on the z axis are exchanged in an initial message upon connection. If both devices' gravity sensor measurements are in the same predefined range, the peer devices 10, 12 identify that they are not orientated face-to-face. For instance, when both devices' gravity sensor measurements are between +9.0 to +9.8 m/s$^2$ (to account for small variations/slopes), the devices 10, 12 are both oriented horizontally and facing downwards. This means that the devices 10, 12 are not facing one another (e.g., as would be the case if one device was facing downwards and the other was facing upwards). Accordingly, even if the device' proximity sensors detect proximity of an object, such as a table or desk onto which both devices 10, 12 have been laid, and even if the obtained sets 24, 28 would match due to the devices 10, 12 being closely located, the devices 10, 12 refrain from automatic data transfer because the devices 10, 12 are not oriented face-to-face. Data from the x axis, y axis, and/or z axis as collected by an orientation sensor may be used instead of or in addition to data collected by a gravity sensor.

No matter the particular conditions that trigger automatic data transfer, or certain steps of processing 100, the peer device 100 according to some embodiments determines the extent to which the obtained sets 24, 28 match in a way that requires both peer devices 10, 12 to contribute to that determination. For example, each peer device 10, 12 may be required to send at least one of its measurement results to the other peer device, for matching evaluation by that other device. In some embodiments, therefore, processing 100 at the peer device 10 implements Block 130 in FIG. 2 by (i) sending a result in the set 24 to the target peer device 12 and receiving a response indicating whether the result matches a result obtained by the target peer device 12; and (ii) receiving a result obtained by the target peer device 12 and indicating in response whether the received result matches one of the results in the set 24 obtained by the peer device 10. FIG. 1 correspondingly shows this determination approach as involving peer device 10 performing transmission 34 to the target peer device 12 conveying a result to the target peer device 12, and target peer device 12 performing transmission 36 to the peer device 10 conveying a result to the peer device 10. Each peer device 10, 12 must therefore disclose at least one of its results to the other peer device. In some embodiments, this guards against a peer device maliciously feigning result matches in an effort to improperly trigger automatic data transfer.

Figure 3:
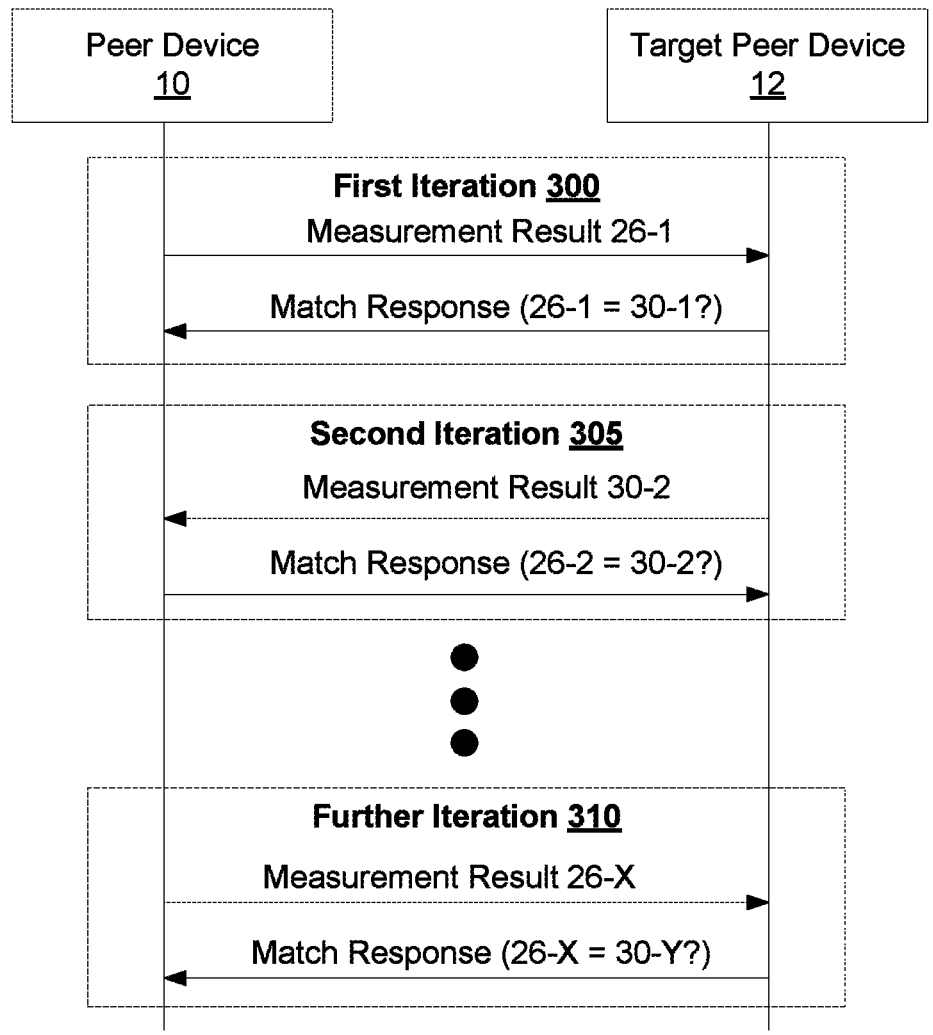
FIG. 3 is a signal flow diagram illustrating alternate measurement result exchange between peer devices according to some embodiments.

FIG. 3 illustrates these embodiments with an example where the peer devices 10, 12 alternate sending measurement results to one another. That is, the peer devices 10, 12 take turns sending results to one another. As shown in FIG. 3, the peer devices 10, 12 take turns sending one single result to another; that is, the alternating occurs one by one. This example is non-limiting, though, in the sense that the peer devices 10, 12 may instead take turns sending results two-by-two, three-by-three, or the like.

In any event, for a first iteration 300 shown in FIG. 3's example, the peer device 10 sends a single result 26-1 to the target peer device 12. The target peer device 12 determines whether this single result 26-1 matches any of the results 30-1 . . . 30-Y in its obtained set 28. The target peer device 12 may for instance determine whether the single result 26-1 and any one of the results 30-1 . . . 30-Y have the same type, and have the same values or values within a permissible margin of error of one another. As shown in this example, both peer devices 10, 12 perform the same number and types of measurements, and the measurement results 26-1 . . . 26-X are ordered in the same way as measurement results 30-1 . . . 30Y. In this case, the target peer device 12 checks whether the received measurement result 26-1 matches its obtained measurement result 30-1. The target peer device 12 correspondingly returns a response indicating whether the sent result 26-1 matches one of the results 30-1 . . . 30-Y obtained by the target peer device 12.

For a second iteration 305, though, the target peer device 12 sends a single result 30-2 to the peer device 10. The peer device 12 determines whether this single result 30-2 matches any of the results 26-1 . . . 26-X in its obtained set 24. The peer device 10 may for instance determine whether the single result 30-2 and any one of the results 26-1 . . . 26-X have the same type, and have the same values or values within a permissible margin of error of one another. The peer device 10 as shown in this regard checks whether the received measurement result 30-2 matches its obtained measurement result 26-2. The peer device 10 correspondingly returns a response indicating whether the sent result 30-2 matches one of the results 26-1 . . . 26-X obtained by the peer device 10. This alternating may stop with only two iterations 300 and 305, or may continue in the same way for one or more further iterations, e.g., until iteration 310 shown in FIG. 3.

Note that in one embodiment, the peer device 10 sends only a portion of the results 26-1 . . . 26X in its obtained set 24 to the target peer device 12. The target peer device 12 may do the same by sending only a portion of the results 30-1 . . . 30-Y in its obtained set 28. The portions respectively sent by the peer devices 10, 12 in this case may be non-overlapping, such that different peer device 10, 12 send mutually exclusive results (e.g., of different types) for matching evaluation by the other device. This effectively forces each device 10, 12 to be the first to disclose at least one measurement result to the other device. For example, each device 10, 12 may be required to be the first to disclose at least one type of measurement result to the other device.

FIG. 3 in such embodiments is therefore modified so that the peer device 10 sends only a portion of the results 26-1 . . . 26-X in its obtained set 24 to the target peer device 12. For ones of the results 26-1 . . . 26-X in this sent portion, the peer device 10 receives a response indicating whether the result matches a result obtained by the target peer device 12. The target peer device 12 may operate in a like manner by sending only a portion of the results 30-1 . . . 30-Y in its obtained set 28.

Figure 4:
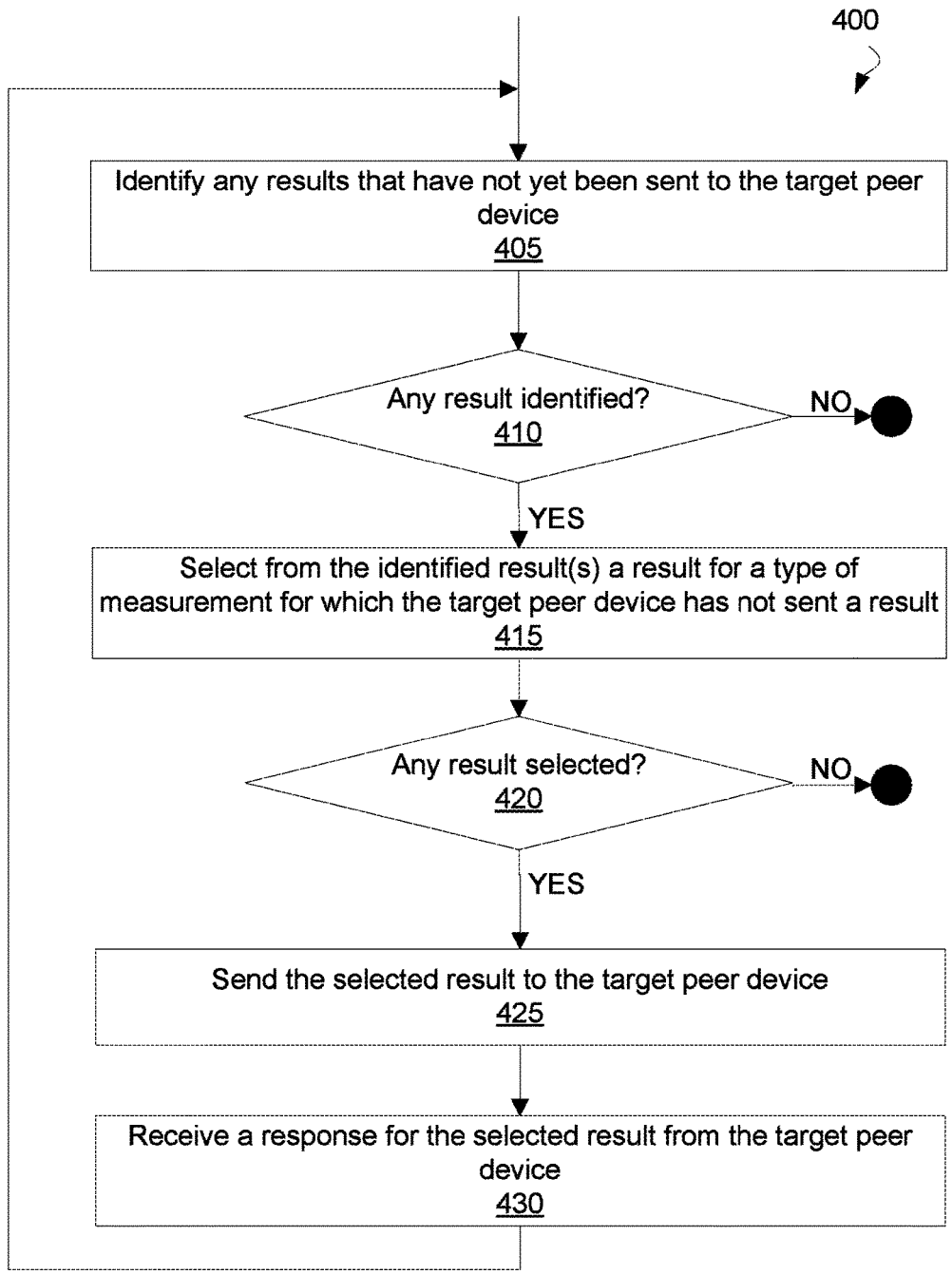
FIG. 4 is a logic flow diagram of a method for performing alternate measurement result exchange between peer devices according to some embodiments.

FIG. 4 illustrates one algorithm 400 for alternating (i.e., taking turns) sending measurement results according to some embodiments. As shown, the peer device 10 attempts to identify any results that have not yet been sent to the target peer device 12 (Block 405). If any result was identified (YES at Block 410), the peer device 10 attempts to select from the identified result(s) a result for a type of measurement for which the target peer device 12 has not sent a result (Block 415). Any selected result therefore has not been sent to the target peer device 12 before and is for a type of measurement for which the peer device 10 has not received a result. If a result was selected (YES at Block 420), the peer device 10 sends the selected result to the target peer device 12 (Block 425). The peer device 10 thereafter receives from the target peer device 12 a response for the selected result whether or not the target peer device 12 deems the selected result to match a result obtained by the target peer device 12 for the same type of measurement (Block 430). This selecting, sending, and receiving are repeated only until no result is selected to be sent. Moreover, in some embodiments, this selecting, sending, and receiving is repeated only after the peer device 10 has received a response from the target peer device 12 for each result previously sent.

Figure 5:
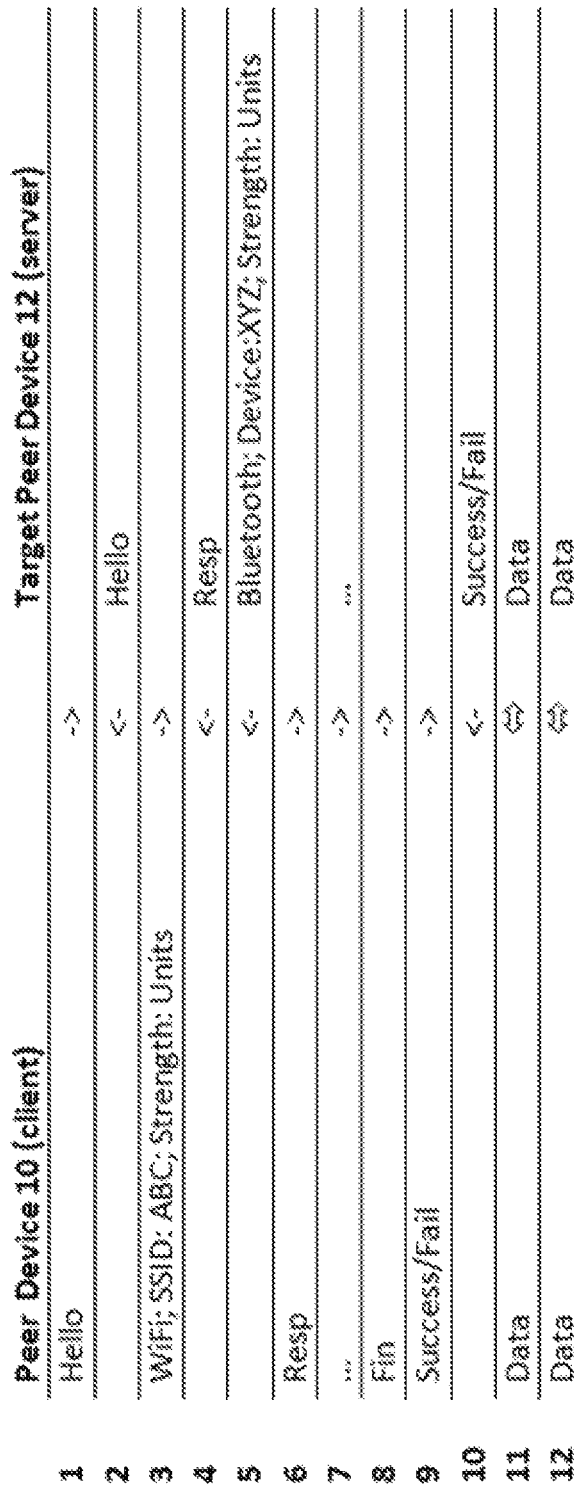
FIG. 5 is a signal flow diagram illustrating an example of alternate measurement result exchange between peer devices according to other embodiments.

FIG. 5 illustrates one concrete example of how the peer devices 10, 12 alternate sending measurement results one by one, in a context where peer device 10 executes its application instance 14A in client mode and target peer device 12 executes its application instance 14B in server mode. Assume in this example that the application 14B executing in server mode intends to transfer data to the application 14A executing in client mode.

As shown in FIG. 5, the peer devices 10, 12 are both actively executing respective instances 14A, 14B of the same application (e.g., a contact card sharing application or a photo sharing application). Responsive to the peer devices' users placing the peer devices 10, 12 in proximity detectable by their respective proximity sensors (e.g., by even tapping the peer devices 10, 12 together), the peer devices 10, 12 each obtain their respective sets 24, 28 of measurement results. In this example, these sets 24, 28 each comprise results of a WiFi measurement and a Bluetooth measurement. The peer devices 10, 12 then configure themselves to be discoverable by other peer devices.

As part of or responsive to the peer devices 10, 12 discovering one another, the peer devices 10, 12 perform a handshake, e.g., by exchanging "Hello" messages in Steps 1 and 2 of FIG. 5. Peer device 10 then sends one measurement result in Step 3. As shown, the peer device 10 does so by indicating (i) that the type of measurement is WiFi strength; (ii) that the WiFi network whose strength is measured has a Service Set Identifier (SSID) of "ABC"; and (iii) that the measured strength has a certain value (shown here with a generic placeholder of "Units"). Target peer device 12 in Step 4 sends a response indicating whether the WiFi strength measurement result matches a Wifi strength measurement result obtained by the target peer device 12, i.e., whether the target peer device's measurement of Wifi SSID "ABC" matches.

After sending this response, the target peer device 12 takes its turn in Step 5 by sending a result of a type of measurement not yet received from or sent to peer device 10. As shown, the target peer device 12 does so by indicating (i) that the type of measurement is Bluetooth strength; (ii) that the Bluetooth device whose signal strength is measured has a device identifier of "XYZ"; and (iii) that the measured strength has a certain value (shown here with a generic placeholder of "Units"). Peer device 10 in Step 6 sends a response indicating whether the Bluetooth strength measurement result matches a Bluetooth strength measurement result obtained by the peer device 10, i.e., whether the peer device's measurement of Bluetooth device "XYZ" matches.

This may continue or repeat in a like manner for zero or more iterations, round, or exchanges. Once a peer device 10, 12 has finished sending measurement results, it sends a "Finished" signal. The other peer device 10, 12 may have more measurement results to send. If so, the other peer device 10, 12 may check whether it in fact needs to send those measurement results, or if instead a decision about whether to automatically initiate data transfer can be satisfactorily made based on the measurement result exchange that has already occurred. The other peer device 10, 12 may for instance check the received measurement result(s) against a threshold to decide whether to send more measurement result(s). In some embodiments, for example, the other peer device may check whether a threshold number of matches has been reached. If so, the other peer device may not need to send any more measurement results.

Once both peer 10, 12 decide that no more results are to be exchanged, the peer devices 10, 12 each independently determine an extent to which their obtained set of results matches the set of results obtained by the other peer device 10, 12, based on the results and responses received. If the sets of results match to a required extent, perhaps allowing for a reasonable margin of error (e.g., 85% or 90% matching), the peer devices 10, 12 may indicate success in Steps 9 and 10, and then proceed with the data transfer in Step 11 and/or 12. On the other hand, if either one of the peer devices 10, 12 determines that the sets of results do not match to the required extent, that peer device 10, 12 declares failure in Step 9 and/or 10 and may drop the connection with the other peer device 10, 12.

Note that the required extent defined as necessary for automatic data transfer may be specified in any number of ways. In some embodiments, the required extent is specified as a percentage threshold of matching. No matter how specified, though, the required extent may be statically fixed or dynamically varying. The required extent may for instance depend on or be a function of how close the peer devices 10, 12 are in proximity, how many other peer devices are in proximity, how many failed automatic transfer attempts have occurred, etc. In some embodiments, for example, a peer device may start with a certain percentage threshold of matching (e.g., 80%), but may be configured to drop that percentage (e.g., by 10% until reaching 50%) upon a defined number of unsuccessful automatic data transfer attempts (e.g., within a defined time interval such as 1 minute).

Figure 6:
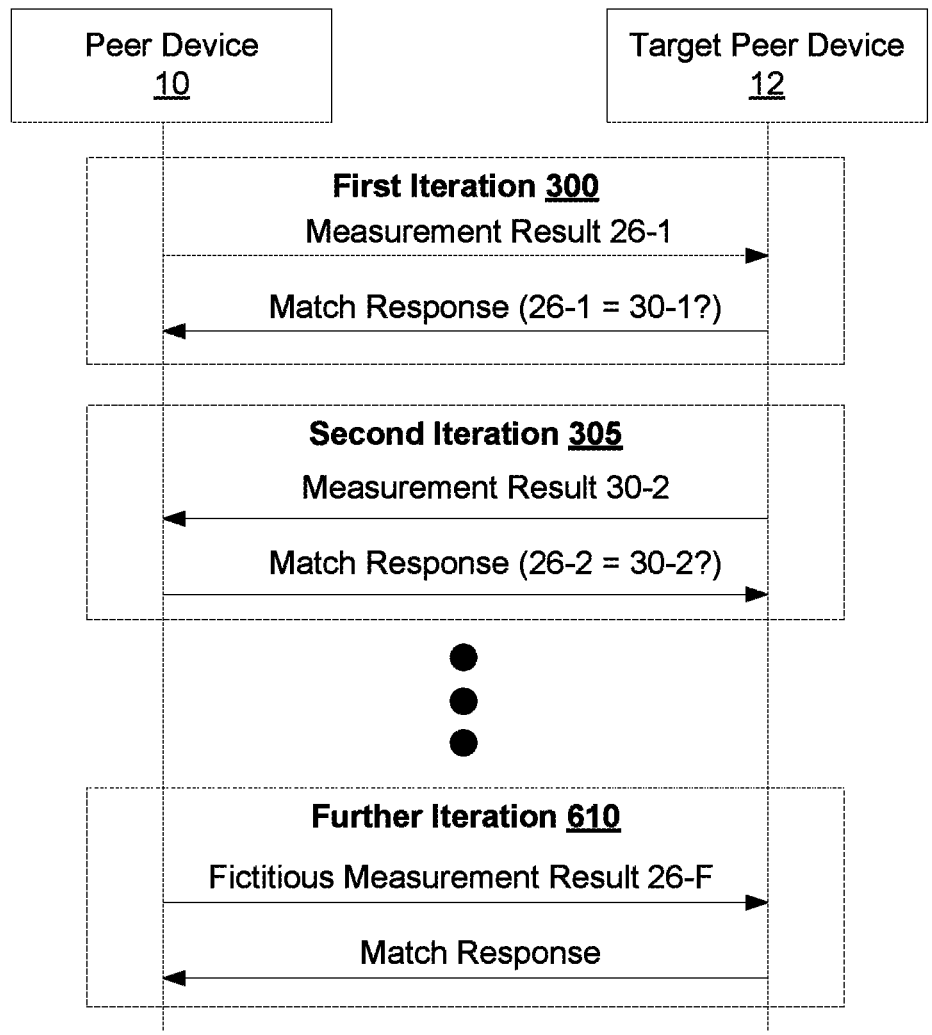
FIG. 6 is a signal flow diagram illustrating alternate measurement result exchange between peer devices according to some embodiments that salt the measurement results with a fictitious result.

Still other embodiments herein may further guard against a peer device maliciously feigning result matches in an effort to improperly trigger automatic data transfer. FIG. 6 for example shows that the measurement result exchange of FIG. 3 may be modified so that peer device 10 transmits a fictitious measurement result 26-F in one of the iterations 610. This fictitious measurement result 26-F is a "fake" result in that the peer device 10 did not actually obtain that result 26-F in its measurements. The fictitious result 26-F may for instance have a value, type, and/or placement/timing in the result exchange that is random. The fictitious result 26-F may thereby mischaracterize the location of the peer device 10, the time at which the measurement was performed, or both. Accordingly, the peer device 10 in some embodiments determines that the obtained sets of results do not match to the required extent if the target peer device 12 indicates that a result obtained by the target peer device 12 matches the fictitious result. The peer device 10 does so based on an assumption that it caught the target peer device 12 in an attempt to maliciously feign a match. The peer device 10 in some embodiments permanently bans a malicious device, e.g., based on the malicious device's MAC address. If the target peer device 12 instead indicates that it does not know whether the received result matches, the peer device 10 may conclude that the target peer device 12 is not maliciously attempting to feign a match.

The result 26-F may be fictitious in any number of respects. For instance, the fictitious result 26-F may be fictitious in terms of its measurement type, measurement value, and/or any other characteristic of the result 26-F on which matching determinations are made. In one example, the peer device 10 fabricates the fictitious result 26-F as an incorrect signal strength value for an actually discovered Wifi network or Bluetooth device. In another example, the peer device 10 fabricates the fictitious result 26-F as an actually measured signal strength value but for a non-existent WiFi network or Bluetooth device. No matter the approach, though, the peer device 10 creates a mismatch between the signal strength value and the signal origin.

Alternatively or additionally, the peer device 10 in yet other embodiments sends a measurement result to the target peer device 12 by withholding disclosure of when the corresponding measurement was performed by the peer device 10. For example, the peer device 10 may refrain from time stamping the measurements sent, may refrain from indicating when proximity to another object was detected, or the like. By not revealing the measurement time, the peer device 10 guards against the target peer device 12 continuously performing measurements in an attempt to have a correct measurement on hand once a connection request for automatic data transfer is received. Indeed, without knowledge of exactly when the measurement was performed, the target peer device 12 would not know which of its continuously taken measurements to use.

Figure 7:
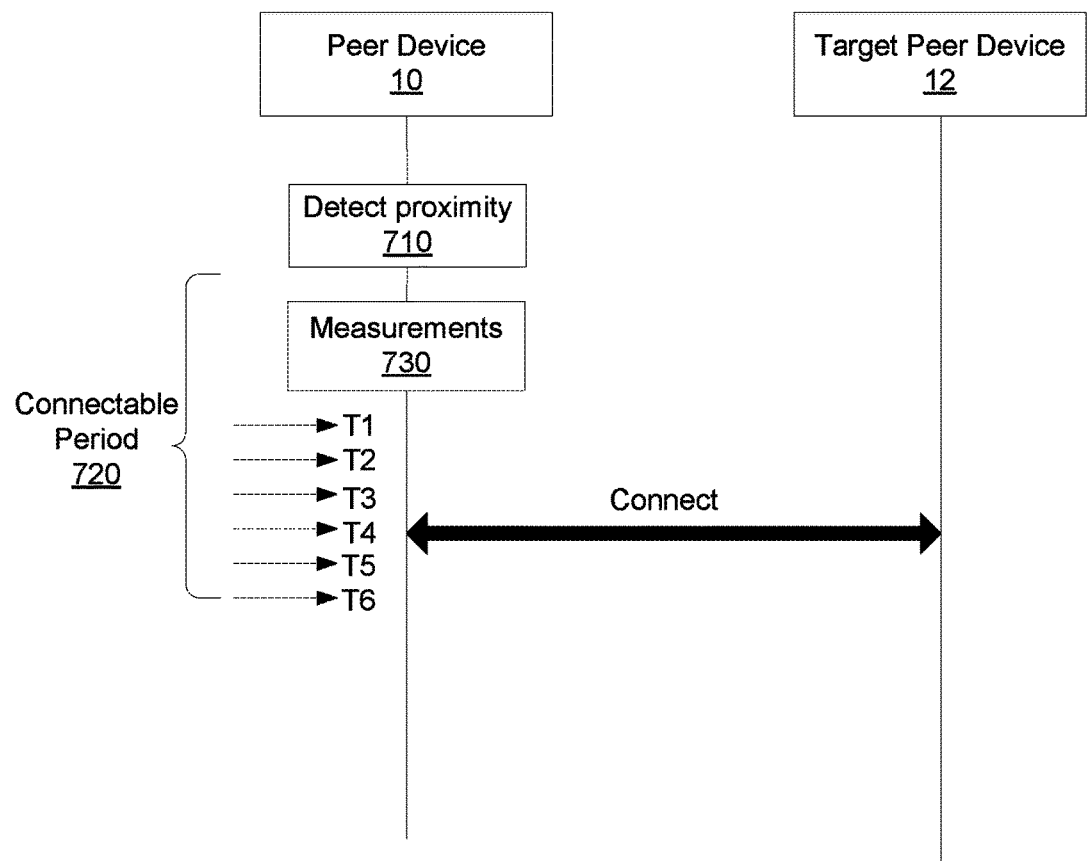
FIG. 7 is a block diagram of random discovery and/or connection attempt timing in accordance with some embodiments.

Separately or as a part of withholding disclosure of its measurement timing, the peer device 10 in some embodiments is configured to wirelessly connect with the target peer device 12 at a random time that occurs within a defined time period after proximity detection. FIG. 7 illustrate one example.

As shown in FIG. 7, the peer device 10 detects proximity in Step 710. This proximity detection initiates a connectable period 720. The connectable period 720 is the period of time during which the peer device 10 is permitted to initiate a connection to a discovered target peer device after proximity detection. This connectable period 720 may extend, from the time of proximity detection, for a threshold time duration. This threshold time duration may be defined for instance to ensure connection within a certain maximum time, after which performance or user experience would suffer. If connection is not made within the threshold time duration, the connection attempt may be aborted.

Regardless, the peer device 10 in some embodiments performs measurements at Step 730 responsive to proximity detection in Step 710. Once measurements are made, the peer device 10 chooses a time at which to make itself discoverable and/or to attempt wireless connection with a discovered target peer device. As shown, for instance, the connectable period 720 includes times T1-T6 at which the peer device 10 may make itself discoverable and/or attempt connection with target peer device 12. The peer device 10 may randomly choose one of times T1-T6 and make itself discoverable and/or attempt connection at the chosen time. FIG. 7 shows that the randomly chosen time is T4, at which point the peer device 10 initiates connection with the target peer device 12. Because the connection time T4 is randomly chosen, the time of connection initiation does not reveal the time at which the peer device 10 performed measurements. This further guards against the target peer device 12 attempting to reverse engineer the measurement time as a function of the discoverable time and/or connection initiation time.

Of course, although some embodiments have been described with respect to a particular target peer device 12, more than one potential target peer device may be within discoverable range of peer device 10. In some embodiments, therefore, the peer device 10 may repeat the above described procedures with multiple different target peer devices in serial or parallel fashion.

A serial implementation may for instance entail the peer device 10 continuing to try to identify matching measurement result sets with other visible/discoverable target devices, until either all device options are exhausted or until a match is found. In some embodiments, the peer device 10 may perform successive connection attempts in a certain order, e.g., in decreasing order of discovery signal strength so as to attempt to connect with stronger signal devices first. In this case, therefore, the peer device 10, for ones of multiple target peer devices, determines whether the sets of results obtained by the peer device 10 and the target peer device match to the required extent. The peer device 10's determination of matching extent is performed in decreasing order of a signal strength with which discovery advertisements are respectively received from the target peer devices and is performed until a match is determined.

Figure 8:
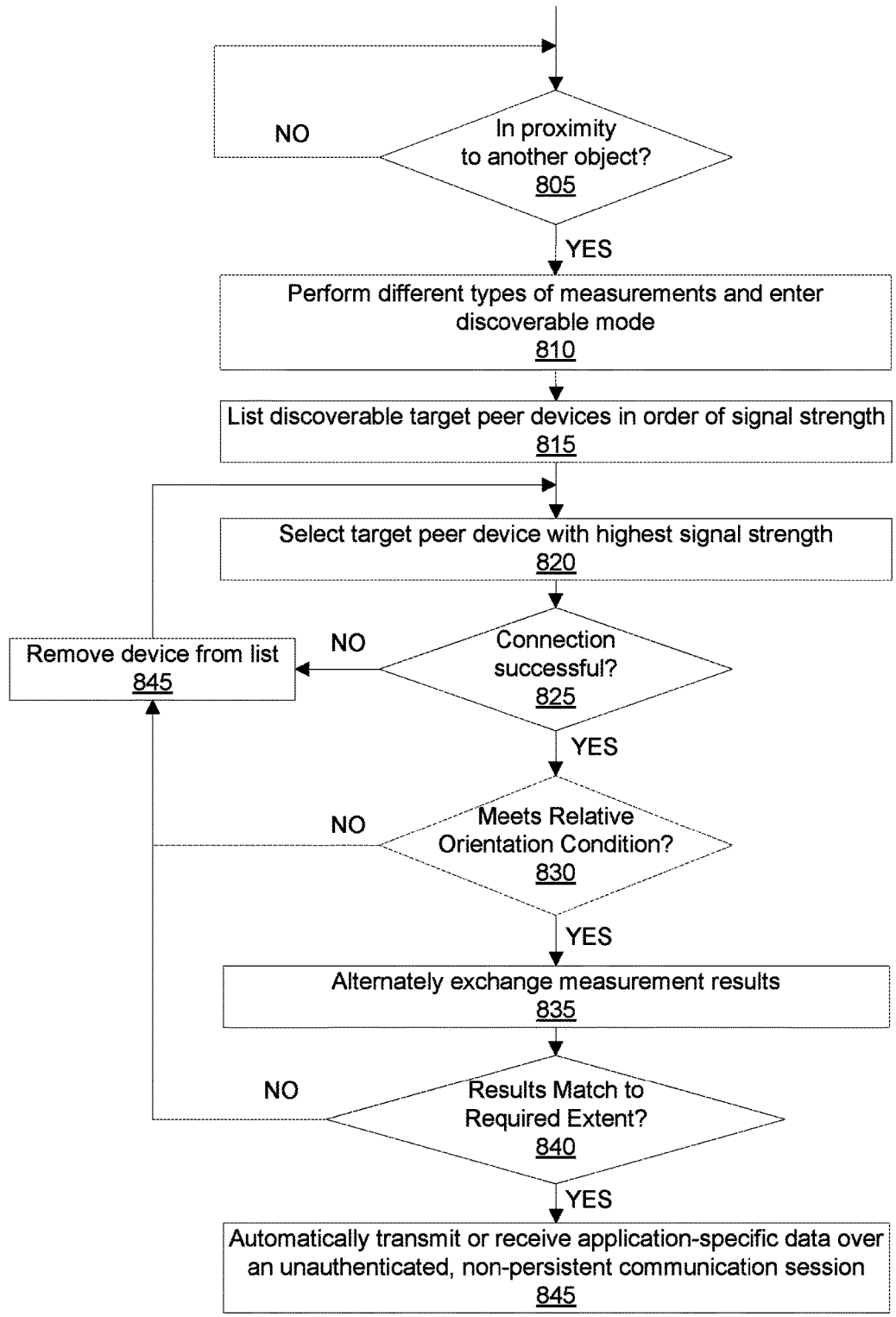
FIG. 8 is a logic flow diagram of a method for performing alternate measurement result exchange between peer devices according to still other embodiments.

FIG. 8 illustrates one algorithm for implementing such embodiments. As shown, the peer device 10 monitors for whether proximity is detected to another object (Block 805). This monitoring continues until proximity is detected (YES At Block 805). Once proximity is detected, the peer device 10 performs different types of measurements and enters discoverable mode as described above (Block 810).

After measuring the detected discovery signals or advertisements from potential target devices, the peer device 10 lists the discoverable target peer devices in order of signal strength (Block 815). The peer device 10 first selects the target peer device in the list with the highest signal strength (Block 820). The peer device 10 attempts to connect with the selected target. If the selected target was in discoverable mode for some other reason than automatic data transfer, that connection attempt may fail. If the connection attempt to a particular target device is unsuccessful (NO at Block 825), the peer device 10 removes that target device from the list (in favor of trying to connect to other targets with lower signal strength). If on the other hand, the connection attempt to a particular target device is successful (YES at Block 825), the peer device 10 may alternately exchange measurement results with that target device as described above (Block 835).

In some embodiments, though, the peer device 10 may first check whether the peer device 10 and the target peer device are oriented relative to one another in a predefined way, as described above (e.g., by exchanging gravity sensor or orientation sensor data). If the devices are not oriented in the predefined way (NO at Block 830), the peer device 10 may disconnect from the target device and remove that device from the list (Block 845). If the devices are indeed oriented in the predefined way (YES at Block 830), the peer device 10 may indeed alternately exchange measurement results with that target device as described above (Block 835).

In any event, after alternately exchanging measurement results with a target device, the peer device 10 determines whether the results match to the required extent as described above (Block 840). If not, the peer device 10 removes that target device from the list (Block 845) and proceeds to select the a discovered target device in the list with the next highest signal strength (Block 820). If the results match to the required extent (YES at Block 840), though, the peer device 10 automatically transmits or receives application-specific data over the communication session 18 (Block 845).

Note that in some embodiments, the peer device 10 in performing the above procedures with multiple target peer devices may send the same or different measurement results to those multiple target peer devices. In some embodiments, for example, the peer device 10 determines a portion of results to send to target peer devices, by randomly selecting that portion of results from its obtained set 24. For ones of the multiple target peer devices, therefore, the peer device 10 determines whether the sets of results obtained by the peer device 10 and the target peer device match to the required extent by sending the same portion of results to that target peer device. That is, the same randomly selected portion of results is sent to all of the target peer devices. This may for instance guard against collusion by multiple malicious devices that may otherwise share received results, so that matches may be feigned.

For example, in some embodiments, up to half of the measurement results may be selected randomly. During one round of handshake attempts with multiple target peer devices, the peer device 10 may send the same random set of measurements to all target devices it attempts to connect. This keeps some measurement results always private, so that they can be safely used for comparing against.

The above approach is of course non-limiting. Indeed, in other embodiments, the peer device 10 may send a different random set of results to different target devices.

Note also that the types of measurements performed by the peer device 10 may include any types of measurements that, collectively, are sensitive to a location of the peer device 10 and a time at which the measurements are performed by the peer device 10. The types of measurements may include for instance a measurement of a strength of a wireless local or personal area network signal detected by the peer device (e.g., WiFi and/or Bluetooth), a measurement of ambient light detected by the peer device, a measurement of noise detected by the peer device, and/or a measurement of magnetic field detected.

Note further that embodiments herein may alternatively or additionally be used for securely connecting (e.g., pairing) peer devices that lack a user interface and/or for ordering a device list presented to a user for pairing.

Figure 9:
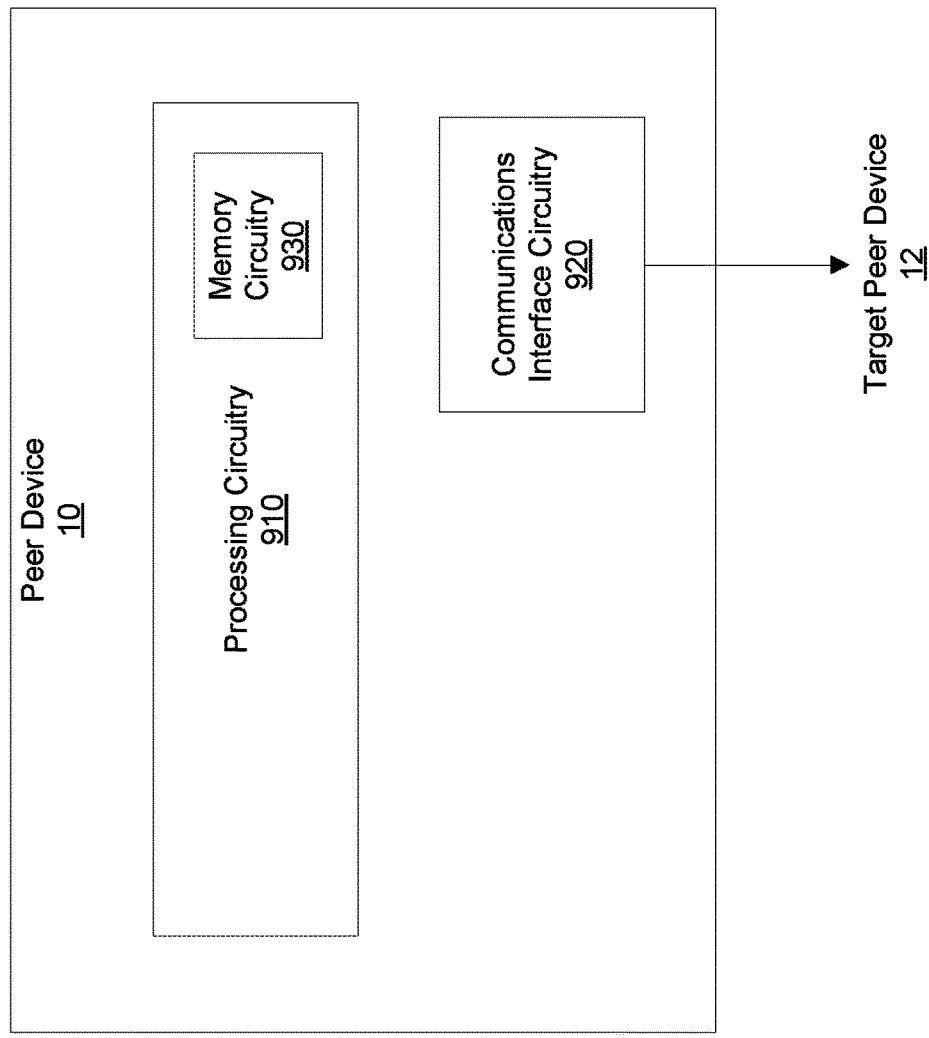
FIG. 9 is a block diagram of a peer device according to some embodiments.

With the above modifications and variations in mind, a peer device 10 is configured via any functional means or units to implement any of the processing described above, e.g., as shown in FIG. 2. In at least some embodiments, for example, the peer device 10 comprises circuitry configured to implement a proximity detector, a result set obtainer, a discoverable mode controller, a match determiner, and an automatic data transmitter or receiver, and any other functional means or units for realizing the above processing. FIG. 9 illustrates the peer device 10 in one or more of these embodiments.

As shown in FIG. 9, the peer device 10 comprises processing circuitry 910 and communications interface circuitry 920. Processing circuitry 910 may be configured to perform the processing shown in FIG. 2. Processing circuitry 910 in this regard may comprise circuits dedicated to performing certain functional processing and/or one or more microprocessors in conjunction with memory 930. In embodiments that employ memory 930, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described Processing circuitry 910 may be implemented by circuitry comprising one or more microprocessors, hardware, firmware, or a combination thereof. In this regard, processing circuitry 910 may be configured to implement instructions that are stored in associated memory 930 and that comprise the logic and instructions needed to perform processing described herein.

The communication interface circuitry 920 includes various components (not shown) for sending and/or receiving information between the peer device 10 and a target peer device 12. More particularly, the interface circuitry 920 includes a transmitter that is configured to use known signal processing techniques, typically according to one or more standards, and is configured to condition a signal for transmission. Similarly, the interface circuitry 920 includes a receiver that is configured to convert signals received into digital samples for processing by the processing circuitry 910. The communication interface circuitry 920 in some embodiments for instance comprises Bluetooth interface circuitry.

Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

The invention claimed is:

1. A method comprising:
   detecting, by a peer device, that the peer device is in proximity to another object, based on a proximity sensor of the peer device detecting a change in an electromagnetic field, or beam of electromagnetic radiation, emitted by the proximity sensor;
   responsive to said detecting, obtaining a set of results that comprises results of different types of measurements, wherein the set of results is sensitive to a location of the peer device and a time at which the measurements are performed by the peer device, and configuring the peer device to be discoverable by other peer devices;
   responsive to wirelessly connecting with a target peer device that is also discoverable, determining an extent to which the obtained set of results matches a corresponding set of results obtained by the target peer device, by:
      sending only a portion of the results in the set to the target peer device and, for ones of the results in the sent portion, receiving a response indicating whether the result matches a result obtained by the target peer device, and
      receiving a result obtained by the target peer device and indicating in response whether the received result matches one of the results in the set obtained by the peer device; and
   responsive to the peer device determining that the sets of results respectively obtained by the devices match to a required extent, automatically transmitting or receiving application-specific data over an unauthenticated, non-persistent communication session between the peer device and the target peer device.

2. The method of claim 1, wherein the different types of measurements comprise a measurement of a strength of a wireless local or personal area network signal detected by the peer device, a measurement of ambient light detected by the peer device, and a measurement of noise detected by the peer device.

3. The method of claim 1, further comprising identifying that the peer device and the target peer device are oriented relative to one another in a certain way predefined as a condition for said determining, by comparing the results of measurements by respective gravity or orientation sensors of the devices, and performing said determining further responsive to said identifying.

4. The method of claim 1, comprising sending the portion of results to the target peer device by withholding disclosure of when the corresponding measurements were performed by the peer device.

5. The method of claim 1, further comprising wirelessly connecting with the target peer device at a random time that occurs within a defined time period after said detecting.

6. The method of claim 1, wherein the obtained set of results further comprises a fictitious result fabricated to mischaracterize the location of the peer device, the time at which the measurement was performed, or both, and determining that the obtained sets of results do not match to the required extent if the target peer device indicates that a result obtained by the target peer device matches the fictitious result.

7. The method of claim 1, wherein said determining is performed by alternating between (i) sending a single one of the results in said portion to the target peer device and receiving a response indicating whether the sent result matches a result obtained by the target peer device, and (ii) receiving a single result obtained by the target peer device and indicating in response whether the received result matches one of the results in the set obtained by the peer device.

8. The method of claim 1, wherein said alternating comprises:
   selecting, from among any results in said portion that have not yet been sent to the target peer device, a result of a type of measurement for which the target peer device has not sent a result;
   sending the selected result to the target peer device;

receiving from the target peer device a response for the selected result indicating whether or not the target peer device deems the selected result to match a result obtained by the target peer device for the same type of measurement; and repeating the selecting, sending, and receiving only after the peer device has received a response from the target peer device for each result previously sent, and only until no result is selected for reporting.

9. The method of claim 1, further comprising, for ones of multiple target peer devices, determining whether the sets of results obtained by the peer device and the target peer device match to the required extent, wherein said determining is performed in decreasing order of a signal strength with which discovery advertisements are respectively received from the target peer devices and is performed until a match is determined.

10. The method of claim 1, further comprising determining the portion of results to send to the target peer device by randomly selecting that portion of results from the obtained set, and, for ones of multiple target peer devices, determining whether the sets of results obtained by the peer device and the target peer device match to the required extent by sending the same portion of results to that target peer device.

11. The method of claim 1, comprising performing said determining also responsive to the peer device and the target peer device actively executing an application to which the application-specific data is specific.

12. A peer device, comprising:
a communications interface to a target peer device; and
processing circuitry configured to:
detect that the peer device is in proximity to another object, based on a proximity sensor of the peer device detecting a change in an electromagnetic field, or beam of electromagnetic radiation, emitted by the proximity sensor;
responsive to said detection, obtain a set of results that comprises results of different types of measurements, wherein the set of results is sensitive to a location of the peer device and a time at which the measurement is performed by the peer device, and configure the peer device to be discoverable by other peer devices;
responsive to wirelessly connecting with a target peer device that is also discoverable, determine an extent to which the obtained set of results matches a corresponding set of results obtained by the target peer device, by:
sending a result in the set to the target peer device and receiving a response indicating whether the result matches a result obtained by the target peer device, and
receiving a result obtained by the target peer device and indicating in response whether the received result matches one of the results in the set obtained by the peer device; and
responsive to the peer device determining that the sets of results respectively obtained by the devices match to a required extent, automatically transmit or receive application-specific data over an unauthenticated, non-persistent communication session between the peer device and the target peer device.

13. The peer device of claim 12, wherein the different types of measurements comprise a measurement of a strength of a wireless local or personal area network signal detected by the peer device, a measurement of ambient light detected by the peer device, and a measurement of noise detected by the peer device.

14. The peer device of claim 12, wherein the processing circuitry is configured to identify that the peer device and the target peer device are oriented relative to one another in a certain way predefined as a condition for said determining, by comparing the results of measurements by respective gravity or orientation sensors of the devices, and perform said determining further responsive to said identifying.

15. The peer device of claim 12, wherein the processing circuitry is configured to send the result to the target peer device by withholding disclosure of when the corresponding measurement was performed by the peer device.

16. The peer device of claim 12, wherein the processing circuitry is configured to wirelessly connect with the target peer device at a random time that occurs within a defined time period after said detection.

17. The peer device of claim 12, wherein the obtained set of results further comprises a fictitious result fabricated to mischaracterize the location of the peer device, the time at which the measurement was performed, or both, and wherein the processing circuitry is configured to determine that the obtained set of results do not match to the required extent if the target peer device indicates that a result obtained by the target peer device matches the fictitious result.

18. The peer device of claim 12, wherein the processing circuitry is configured to perform said determining by alternating between (i) sending a single result to the target peer device and receiving a response indicating whether the sent result matches a result obtained by the target peer device, and (ii) receiving a single result obtained by the target peer device and indicating in response whether the received result matches one of the results in the set obtained by the peer device.

19. The peer device of claim 12, wherein the processing circuitry is configured to perform said alternating by:
selecting, from among any results that have not yet been sent to the target peer device, a result of a type of measurement for which the target peer device has not sent a result;
sending the selected result to the target peer device;
receiving from the target peer device a response for the selected result indicating whether or not the target peer device deems the selected result to match a result obtained by the target peer device for the same type of measurement; and
repeating the selecting, sending, and receiving only after the peer device has received a response from the target peer device for each result previously sent, and only until no result is selected for sending.

20. The peer device of claim 12, wherein the processing circuitry is configured to, for ones of multiple target peer devices, determine whether the sets of results obtained by the peer device and the target peer device match to the required extent, wherein said determination is performed in decreasing order of a signal strength with which discovery advertisements are respectively received from the target peer devices and is performed until a match is determined.

21. A computer program product stored on a non-transitory computer-readable storage medium and comprising computer program code that, when executed by processing circuitry of a peer device, configures the peer device to:
detect that the peer device is in proximity to another object, based on a proximity sensor of the peer device detecting a change in an electromagnetic field, or beam of electromagnetic radiation, emitted by the proximity sensor;

responsive to said detection, obtain results of different types of measurements that are each sensitive to a location of the peer device and a time at which the measurement is performed by the peer device, and configure the peer device to be discoverable by other peer devices;

responsive to wirelessly connecting with a target peer device that is also discoverable, determine an extent to which the obtained results match corresponding results obtained by the target peer device, by:

sending a result in the set to the target peer device and receiving a response indicating whether the result matches a result obtained by the target peer device, and receiving a result obtained by the target peer device and indicating in response whether the received result matches one of the results in the set obtained by the peer device; and responsive to the peer device determining that the results respectively obtained by the devices match to a required extent, automatically transmit or receive application-specific data over an unauthenticated, non-persistent communication session between the peer device and the target peer device.

* * * * *